(12) United States Patent
Franchuk et al.

(10) Patent No.: US 7,058,089 B2
(45) Date of Patent: Jun. 6, 2006

(54) SYSTEM AND METHOD FOR MAINTAINING A COMMON SENSE OF TIME ON A NETWORK SEGMENT

(75) Inventors: Brian A. Franchuk, Richfield, MN (US); Roger R. Benson, Eden Prairie, MN (US)

(73) Assignee: Rosemount, Inc., Eden Prairie, MN (US)

( * ) Notice: Subject to any disclaimer, the term of this patent is extended or adjusted under 35 U.S.C. 154(b) by 23 days.

(21) Appl. No.: 10/781,374

(22) Filed: Feb. 18, 2004

(65) Prior Publication Data

US 2005/0180466 A1    Aug. 18, 2005

(51) Int. Cl.
*H04J 3/06* (2006.01)

(52) U.S. Cl. .................... 370/503; 713/400

(58) Field of Classification Search ........ 370/503–516; 375/354–356; 709/208, 248; 713/400
See application file for complete search history.

(56) References Cited

U.S. PATENT DOCUMENTS

| | | | |
|---|---|---|---|
| 4,939,753 A | 7/1990 | Olson | |
| 5,293,374 A | 3/1994 | Eidson | |
| 6,119,047 A | 9/2000 | Eryurek et al. | |
| 6,298,454 B1 | 10/2001 | Schleiss et al. | |
| 6,377,859 B1 | 4/2002 | Brown et al. | |
| 6,434,504 B1 | 8/2002 | Eryurek et al. | |
| 6,445,963 B1 | 9/2002 | Blevins et al. | |
| 6,449,574 B1 | 9/2002 | Eryurek et al. | |
| 6,473,660 B1 | 10/2002 | Thibault | |
| 6,485,688 B1 | 11/2002 | Sivavec et al. | |
| 6,505,519 B1 | 1/2003 | Henry et al. | |
| 6,519,546 B1 | 2/2003 | Eryurek et al. | |
| 6,522,934 B1 | 2/2003 | Irwin et al. | |
| 6,532,392 B1 | 3/2003 | Eryurek et al. | |
| 6,535,926 B1 * | 3/2003 | Esker .................... | 709/248 |
| 6,539,489 B1 * | 3/2003 | Reinert .................. | 713/400 |
| 6,885,717 B1 * | 4/2005 | Kaesdorf et al. ........ | 375/362 |
| 2001/0023464 A1 | 9/2001 | Deck et al. | |
| 2002/0010562 A1 | 1/2002 | Schleiss et al. | |
| 2002/0022894 A1 | 2/2002 | Eryurek et al. | |
| 2002/0029130 A1 | 3/2002 | Eryurek et al. | |
| 2002/0037017 A1 | 3/2002 | Kiesel et al. | |
| 2002/0038156 A1 | 3/2002 | Eryurek et al. | |
| 2002/0061083 A1 | 5/2002 | Kaesdorf et al. | |
| 2002/0112044 A1 | 8/2002 | Hessmer et al. | |
| 2002/0126782 A1 | 9/2002 | Rotsch et al. | |

(Continued)

OTHER PUBLICATIONS

Raja et al, Synchronous Model for Fieldbus Applications, IEEE, pp. 525-529, 1993.*

*Primary Examiner*—Frank Duong
(74) *Attorney, Agent, or Firm*—Kinney & Lange, P.A.

(57) ABSTRACT

The system has a control center, a time master device and a plurality of distributed, time slave field devices in synchronization with a master clock of the time master device. The time master device periodically transmits a time distribution data unit. Each time slave field device has a timer adjustment element, a fixed rate clock and a variable clock. The timer adjustment element calculates a frequency ratio between the master clock and the fixed rate clock and uses the frequency ratio to calculate adjustment coefficients to adjust a local sense of time for each field device, such that a time stamp of each field device is synchronized to the master clock.

21 Claims, 6 Drawing Sheets

U.S. PATENT DOCUMENTS

2002/0147511 A1 10/2002 Eryurek et al.
2002/0167904 A1 11/2002 Borgeson et al.
2002/0169582 A1 11/2002 Eryurek et al.
2002/0183971 A1 12/2002 Wegerich et al.
2002/0194547 A1 12/2002 Christensen et al.
2003/0040881 A1 2/2003 Steger et al.
2003/0046380 A1 3/2003 Steger et al.
2003/0056043 A1 3/2003 Kostadinov

* cited by examiner

SYSTEM AND METHOD FOR MAINTAINING A COMMON SENSE OF TIME ON A NETWORK SEGMENT

BACKGROUND OF THE INVENTION

The present invention relates to timing in a process control network. More particularly, the present invention relates to a system and method for maintaining a common sense of time among devices in a segment of a process control packet based network.

In industrial processes, and particularly in control systems, data transmitted over the network may be critical or not. Critical data is data that is considered valid only for a limited period of time. Typically, such data represents real-time measurements and/or control information and is considered time-constrained by the process. All processing of such data, including both computing and transmission, must be carried out in a bounded time. Processing of non-critical data is less time-sensitive.

Non-time-constrained data involves data transmitted over the network in which a delay on the respective processing has no effect on the proper operation of the manufacturing process or on the quality of the products. Nevertheless, such data typically includes timing information so that the control system can monitor the timeliness (e.g. the time intervals and timing relationships) of various transactions and processes on the control network.

While devices on the packet based network (e.g. Foundation Fieldbus) typically have their own clocks for maintaining time, due to differences in the clocks and to distances between devices, it is difficult to synchronize precisely the clocks' signals between the control system and the various devices across the entire segment.

The purpose of the time synchronization on the segment is to provide a shared, approximately synchronized, internal time reference for all connected devices. Generally, the time synchronization includes both a monotonically increasing component and an offset component. The monotonically increasing component increases with time beginning with a value of zero at the startup of the local end system. The offset component is a value that, when added to the monotonically increasing component, causes the sum to be approximately equal to the corresponding sums of other correctly-functioning devices on the segment.

Conventionally, to maintain a common sense of time among the various devices on a segment of a process control network, one of the devices on the segment serves as a time master, sending time updates to the other devices on the segment, known as time slaves. The time slaves then use the time updates to synchronize their own "sense of time" to that of the time master. However, since the devices are physically separate entities, their internal clocks will not run at exactly the same rate as that of the time master.

To account for timing differences, the internal clock of each slave device must be scaled so that the devices can maintain a sense of time that is synchronized to the time master. In the case of a Foundation Fieldbus network, this scale factor for each device must be sufficiently accurate to meet the maximum phase-tracking error specified in the Foundation Fieldbus Datalink Protocol Specification, ANSI/ISA-S50.02 (1997), section 11.3a. Additionally, the scale factor must be applied to the internal clock of the device each time the device's sense of time is read.

Conventional systems implement the time scaling in software, thereby incurring software processing overhead each time the sense of time is read. The software overhead can be significant since the scale factor is a fixed-point, or potentially a floating-point number.

BRIEF SUMMARY OF THE INVENTION

A process control system has a control center, a time master device and a plurality of time slave field devices in network communication with one another. The time master has a master clock and each field device has a local clock and a timer adjustment element. The time master periodically transmits timing information from the master clock to the field devices over the network. Each field device calculates adjustment coefficients according to the difference in rates between the master clock and the local clock, and adjusts an output clock signal and a time stamp as needed to synchronize the local clock to the master clock.

DETAILED DESCRIPTION

Figure 1:
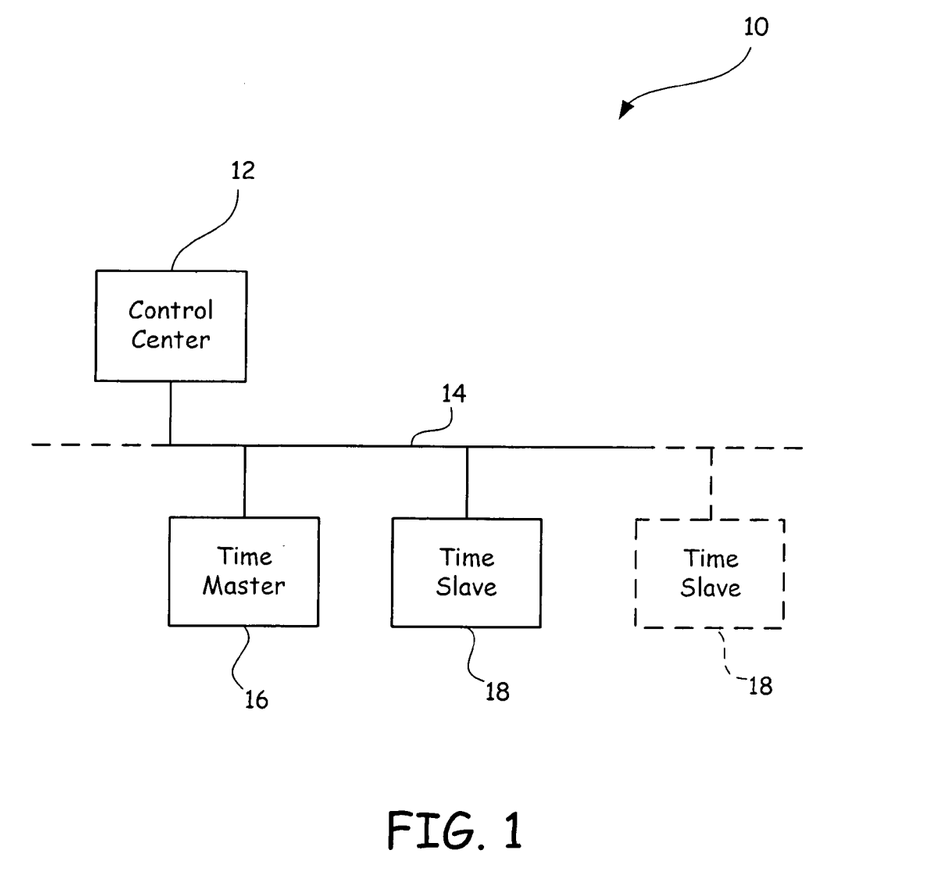
FIG. 1 is a block diagram illustrating a time master device and time slave devices on a process control network.

FIG. 1 shows a industrial control system 10 having a control center 12 connected via a homerun cabling 14 to a plurality of field devices. One field device serves as a time master 16, periodically sending time updates to the other devices on the Fieldbus segment via the cabling 14. The other field devices on the segment are time slaves 18, which utilize the periodic time updates to synchronize their sense of time to that of the time master 16. The homerun cable 14 extends in phantom and an additional time slave 18 is also shown in phantom to illustrate that the homerun cabling 14 may be extended and field devices 18 may be added to extend the control network as needed.

As previously mentioned, the time master 16 and the time slaves 18 are both field devices. For the purpose of the following discussion, the term "field device" refers to any device that performs a function in a distributed control system, including all devices currently known in the control art. Generally, each field device 16, 18 includes a transducer and/or actuator. A transducer is understood to mean either a device that generates an output signal based on a physical input or that generates a physical output based on an input signal. Typically, a transducer transforms an input into an output having a different form. Often, one system provides power to actuate a transducer, which in turn supplies power usually in another form to a second system. Types of transducers typically include various analytical equipment and sensors, pressure sensors, thermistors, thermocouples, strain gauges, flow transmitters, level transmitters, valve actuators/positioners, positioners actuators, solenoids, indicator lights, and the like.

Generally, each field device 16, 18 includes an internal clock. In distributed control systems, it is desirable to achieve system synchronization to ensure the correct timing of events and of control efforts, such that the field devices 16,18 have a common sense of time. However, since the field devices are independent from one another, their clocks are not necessarily synchronized. "The maximum a synchronism in the Fieldbus-shared sense of time determines the coarseness or fineness of such shared activities as distributed time-based scheduling and distributed sequence-of-events determination." See Fieldbus Standard for Use in Industrial Control Systems Part 4: Data Link Protocol Specification, SP50.02 (1997), section 11.3(a), p.283. The Data Link Protocol specification, section 11.3a, defines eight classes of time synchronization, ranging from 1 microsecond to 1 second. While the specific level of granularity of the time-synchronization of a fieldbus network depends on its specific requirements and implementation, the field devices must maintain a "sense of time" relative to the time master that is accurate enough to meet the maximum phase-tracking error according to the selected level of granularity.

Figure 2:
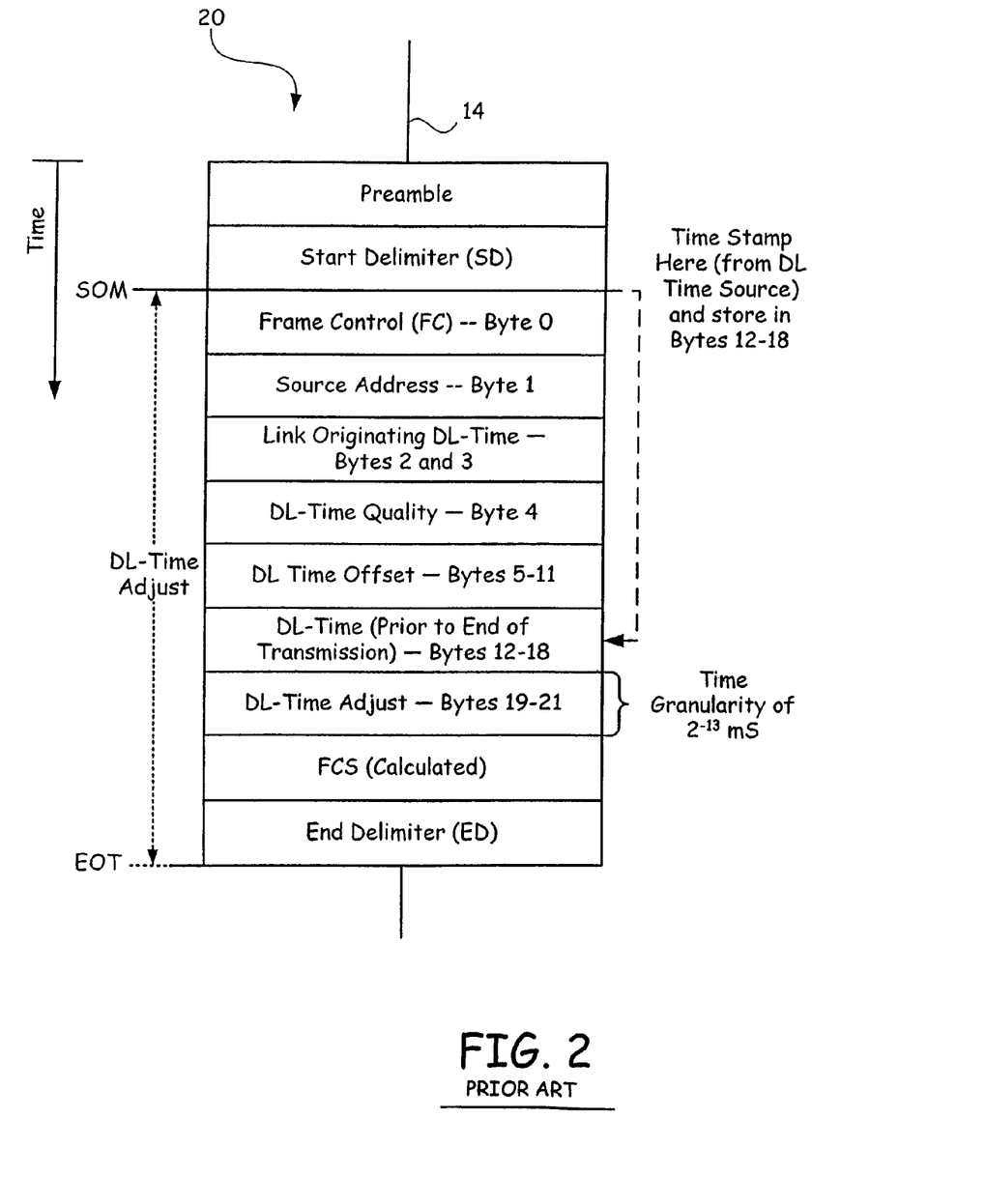
FIG. 2 is a block diagram of a Time Distribution (TD) data link protocol data unit (DLPDU).

FIG. 2 illustrates a standard time distribution (TD) DLPDU 20, which is transmitted over the homerun cabling 14 by the time master 16 to enable the time slaves 18 on the local link to coordinate and to synchronize the rates of advance of their senses of data-link time (DL-Time). The TD DLPDU is a specific type of DLPDU that is transmitted on the local link by the time master 16 either upon receipt of a token from a Compel Time (CT) DLPDU or at appropriate intervals when the time master 16 holds the scheduler token.

In general, a TD DLPDU is comprised of several fields: a preamble field, a Start Delimiter (SD) field, a Frame Control (FC) field, a Source Address field, a Link Originating DL-Time field, a DL-Time Quality field, a DL-Time Offset field (defined by "FIELDBUS STANDARD FOR USE IN INDUSTRIAL CONTROL SYSTEMS PART 4: DATA LINK PROTOCOL SPECIFICATION", Approved Jan. 6, 1998, hereinafter referred to as "DLP §", section 8.6c), a DL-Time field (DLP § 8.6d), a DL-Time Adjust field (DLP §8.6e), a Frame Check Sequence (FCS), and an end delimiter (ED). The Frame Control (FC) field consists of one octet, which specifies the type of DLPDU, and in the case of a TD DLPDU, the FC field includes a number of fractional-octet parameters known as frame-control subfields.

The Link Originating DL-Time field represents the DL-time of the transmitting field device, always the time master 16. The DL-Time Quality field represents the multi-partite quality of the time slave 18, the time master 16 and the path of the time distribution on the local link. The DL-Time Offset field records the signal offset (difference) between DL-time and the local link scheduling time.

The DL-Time field is generated by the time-stamp upon transmission of the Start Delimiter (SD). Finally, the DL-Time Adjust is the time between the DL-Time field time stamp and the end of transmission (EOT), such that the sum of the DL-Time field and the DL-Time adjust field is the time at EOT.

Figure 3A:
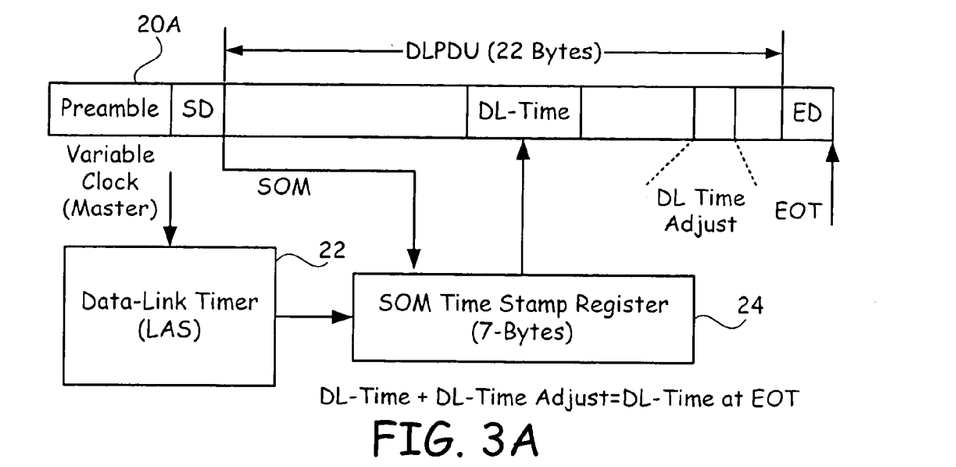
FIG. 3A is a block diagram of the formation of a time distribution data link protocol data unit with respect to the time master device.

As shown in FIG. 3A, the DLPDU 20 (labeled as 20A to distinguish the transmitted DLPDU 20 from the received DLPDU 20, labeled as 20B) is generated by the time master 16, sometimes referred to as the link active scheduler (LAS). When the time master transmits a TD DLPDU, the following events occur. Transmission begins by sending the Preamble and SD fields. As shown, a Start Delimiter (SD) causes a start of message (SOM) signal. The SOM signal causes a data-link timer (LAS) 22 to copy its current time into a time stamp register 24, which is in turn stored in the DL-Time field of the DLPDU 20A. In addition, the DL-Time Adjust field is set such that the sum of the DL-Time and DL-Time Adjust fields is the time at the end of transmission. Remaining fields of DLPDU 20A are then transmitted on the local link.

Figure 3B:
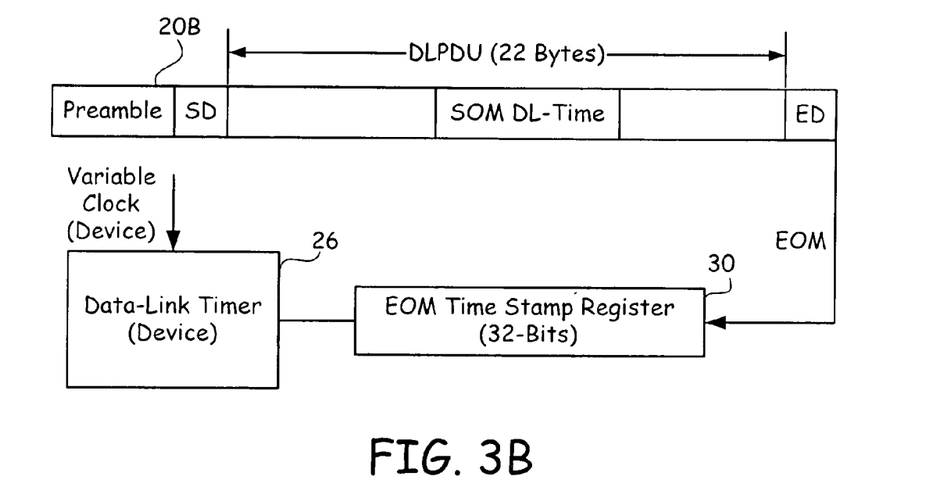
FIG. 3B is a block diagram of the time distribution data link protocol data unit of FIG. 3A with respect to the receiving slave device.

In FIG. 3B, the receiving field device or time slave 18 detects the DLPDU 20 (labeled as 20B). The time slave device 18 stores the DLPDU data in a receive first input first output register (receive FIFO). At the moment the ED is received, an EOM time stamp 30 is taken from the receiver's Data Link Timer 26. The time slave device 18 then reads the data from the receive FIFO and processes the end of message (EOM) time stamp by comparing the EOM time stamp with the adjusted DL-Time in the TD DLPDU. A signal from a variable clock (shown in FIG. 4) adjusts the local time of the data-link timer 26 to be synchronized with the time master 16. The objective of this time adjustment process is to ensure that the local time of the slave device 18 is as close as possible to the time on the local link, according to the time master 16. Specifically, the slave device 18 updates the quality of DL-Time, the DL-Time Offset, the local link scheduling time offset, and the node timer frequency by comparing the local time variables with the corresponding fields of the received DLPDU 20A (see DLP §9.4.1.3) Such comparisons serve to detect changes either in the reference source for the time or in the time distribution path.

Figure 3C:
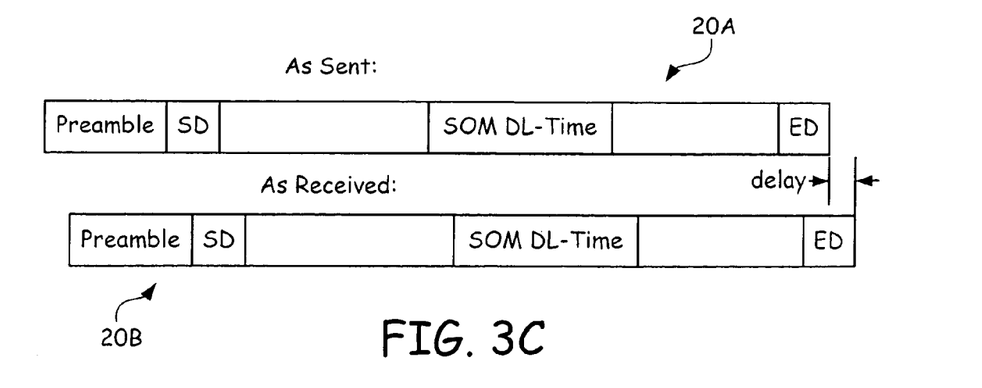
FIG. 3C is a block diagram illustrating the time delay between transmission and receipt of the time distribution data link protocol data unit.

As shown in FIG. 3C, the time difference between the transmission of the DLPDU 20A and reception of the DLPDU 20B represents a time delay. This time delay is the delay through the cabling 14 along with any delay through the Fieldbus. Devices can use the Round-trip-delay query (RQ) and the Round-trip-delay Reply (RR) DLPDUs to measure the delay between the time master 16 (LAS) device and the time slaves 18. The slave device 18 determines if its local reference of Data-Link time (e.g. its shared sense of time) is running fast or slow with respect to the time master 16, by adding the DL-Time to the DL-Time Adjustment stored in the transmitted TD DLPDU by the time master 16 and by comparing the resulting sum with the time at which the End of Message time stamp arrived.

Figure 4:
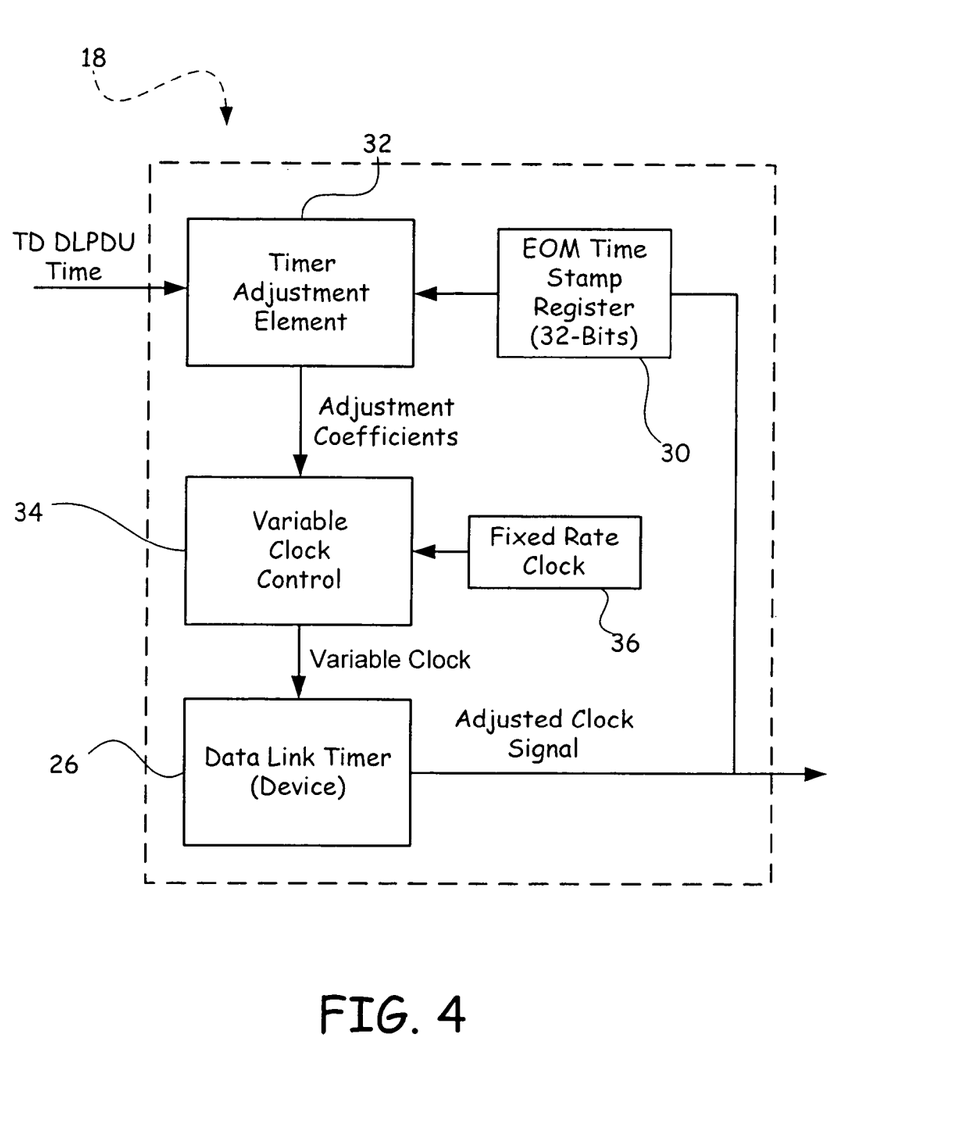
FIG. 4 is a block diagram of time circuit elements of a slave device according to one embodiment of the present invention.

As shown in FIG. 4, the slave device 18 contains timer and timing adjustment elements. Specifically, upon receipt of a TD DLPDU from the cabling 14 (or from the Fieldbus network), the timer adjustment element 32 reads the time stamp values from the End of Message (EOM) time stamp register 30. The timer adjustment element 32 calculates adjustment coefficients, which are passed to a variable clock 34.

The variable clock 34 receives the adjustment coefficients and a fixed rate clock signal from an internal clock 36 of the time slave 18, and generates an adjusted clock signal, which is passed to the data link timer 26, which updates the EOM time stamp register and outputs the adjusted clock signal.

The variable clock 34 is a variable speed hardware clock having a fixed rate clock input (Fixed_clock_in), a variable rate clock output and two integer parameters, add and subtract. The variable clock 34 receives the fixed rate clock input signal from the internal clock 36 of the slave device 18. The variable clock 34 applies an algorithm (shown with respect to the timing diagrams in FIGS. 5A and 5B) to the fixed rate clock input signal based on the add and subtract parameters. Generally, the variable clock 34 produces one output clock pulse for every two fixed rate clock input pulses. In addition, the add (a) and subtract (s) parameters are used to insert additional and remove pulses from the output clock signal. The algorithm is as follows: for every "a" pulse, insert one extra pulse in the output clock signal, and for every "s" pulse, remove one pulse.

The resulting output clock signal produced by the variable clock 34 runs at a long-term rate of $$\frac{\text{Fixed\_clock\_in}}{2} * F(\text{Add, Subtract})$$

where $$F(\text{Add, Subtract}) = 1 + \frac{1}{\text{Add}} - \frac{1}{\text{Subtract}}.$$

The resulting output clock signal is used to adjust and maintain the sense of time of the time slave 18. More specifically, the resulting output clock signal is used to synchronize the clock rates of data link timer 26 of the time slave device 18 with the time rate of the time master 16 on the local link.

The timer adjustment element 32 may be implemented in software or in hardware or a combination of both. In a preferred embodiment, the timer adjustment element 32 is a software component stored in the firmware of the slave device 18. Whether implemented in hardware or in software, the timer adjustment element 32 generally calculates the add and subtract parameters such that $$F(F'_{Add}(\text{rate}), F'_{Subtract}(\text{rate})) = \text{rate} + \text{rate\_error}$$

where the rate error is the error between the actual rate and the requested rate, resulting from rounding errors during the calculation of the add and subtract parameters. Generally, the time slave 18 must ignore its local sense of time and make adjustments to correspond with that of the time master 16.

By updating the EOM time stamp register 30 with the hardware scaled or adjusted clock signal, time stamping does not incur software overhead. Further, by using a variable clock to control the time of the data link timer 26 of the time slave 18, software resources are not used for time scaling when reading the sense of time of the time slave device 18. Instead, software is used to calibrate the add and subtract variables, resulting in a hardware time adjustment, allowing all scaling to be performed in hardware. Software overhead is only incurred when the time rate must be changed. Since the time rate typically changes much less frequently than the sense of time is requested (e.g. time stamping is required), the overall software overhead is minimal. As a result, software processing clock cycles are conserved, which can then be used in other ways, such as to perform other operations or to assist in data processing or grooming of the data.

Figure 5A:
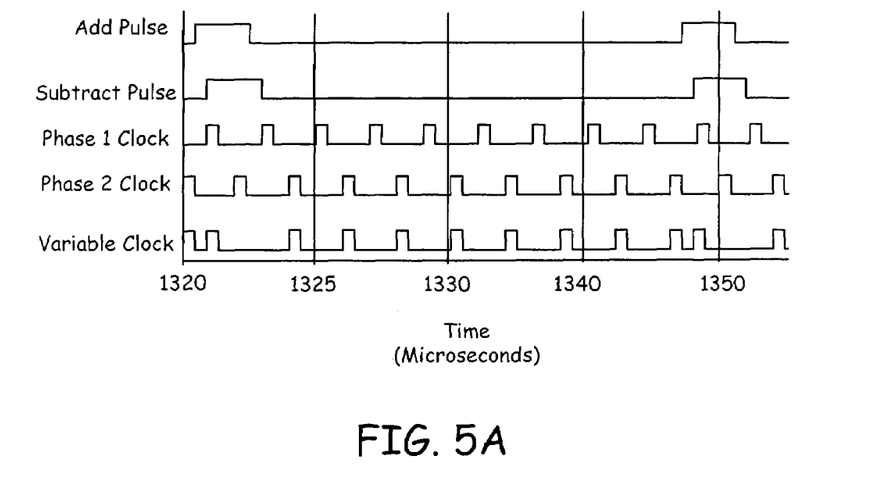
FIGS. 5A and 5B are timing diagrams illustrating the method for synchronizing the slave device clock circuitry with the time master.
Figure 5B:
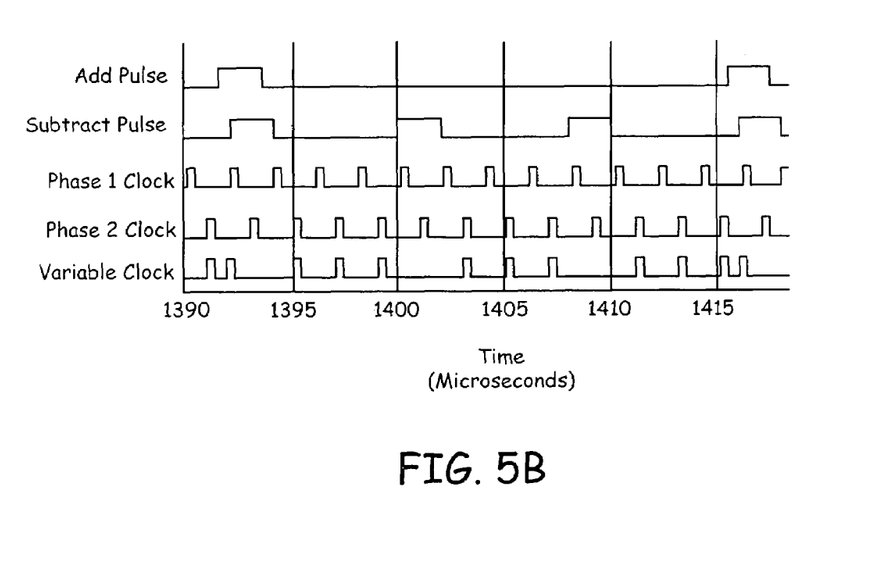

As shown in FIGS. 5A and 5B, when the add pulse signal is logic high, the resulting output signal from the variable clock is two closely spaced pulses. As shown in FIG. 5A, between 1320 and 1325 microseconds, both an add pulse and a subtract pulse input are presented to the variable clock, resulting in a variable clock output having two closely spaced pulses followed by a gap between pulses that is greater than the clock frequency of the fixed rate input clock represented by the phase 2 clock. The subtract pulse signal shifts to logic high slightly after the add pulse signal, resulting in a subtraction of the next pulse in the sequence.

As shown in FIG. 5B, at the 1400 microsecond mark, a subtract pulse signal goes to logic high, resulting in the elimination or absence of a variable clock output pulse corresponding to the phase 2 clock pulse at the same position. The resulting output clock signal is then passed to the data link timer 26 (shown in FIG. 4), to update the sense of time of the time slave device 18.

Figure 6:
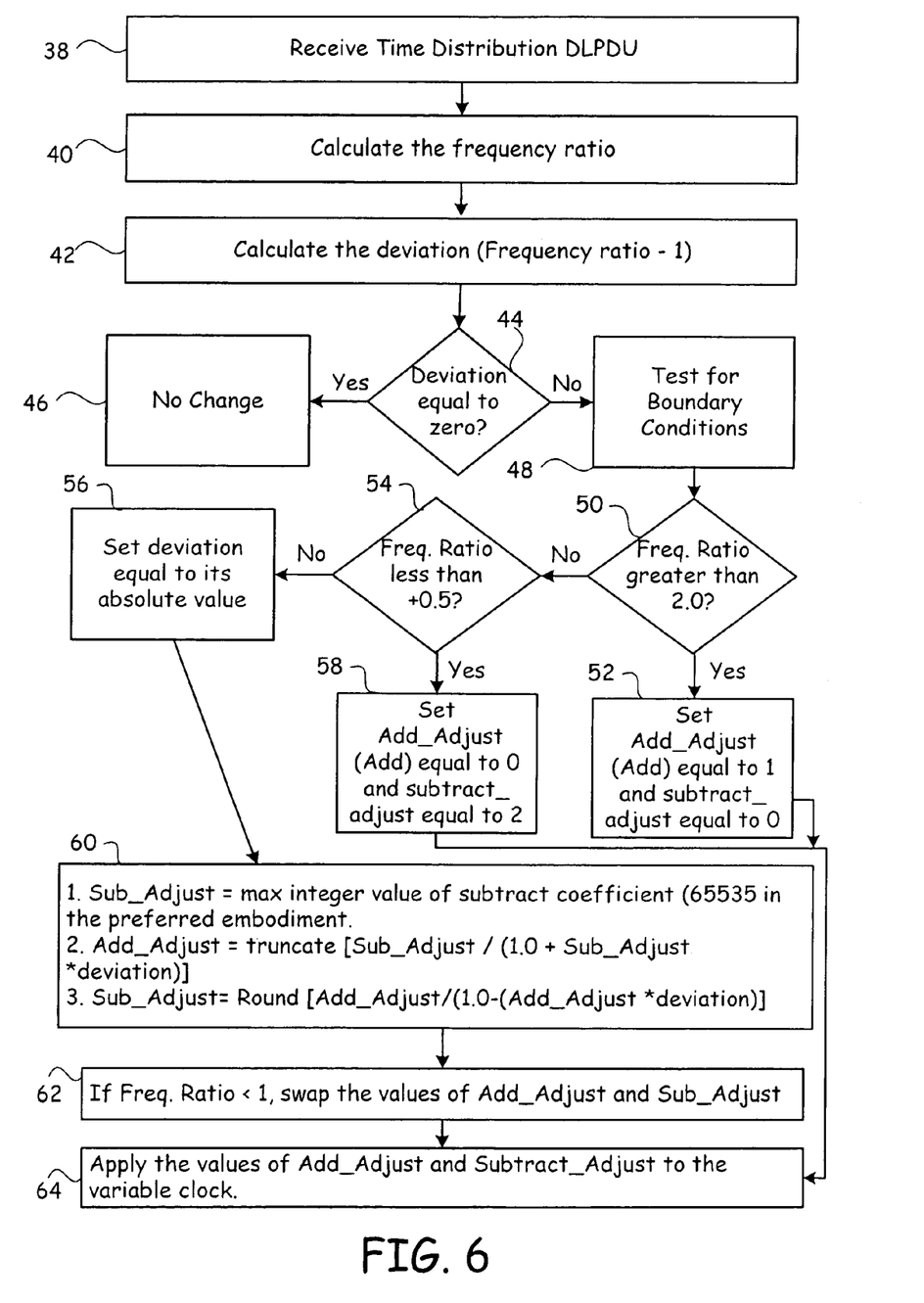
FIG. 6 illustrates a flow diagram for synchronizing the slave devices to the master device according to an embodiment of the present invention.

FIG. 6 is a flow diagram of an embodiment of the process used by the timer adjustment element 32 of FIG. 4 for calculating the add and subtract parameters. This process may be implemented in software or firmware in the time slave device 18 or in hardware. In general, the timer adjustment element 32 checks for boundary conditions (e.g. a frequency ratio of less than 0.5, of exactly 1, or of greater than 2), calculates the clock coefficients, and swaps the coefficients if the frequency ratio is less than 1.

As shown, the TD DLPDU is received. (Step 38). The timer adjustment element 32 calculates the frequency ratio of the time master 16 clock signal over the time slave 18 fixed rate clock signal. (step 40). The timer adjustment element 32 then calculates the deviation of the frequency ratio from the ideal ratio of 1.0. (step 42). The deviation is calculated according to the following equation:

$$\text{deviation} = \text{frequency\_ratio} - 1.$$

The timer adjustment element 32 tests whether the deviation was equal to zero (step 44). If the deviation is equal to zero, then the timer adjustment element 32 passes zero valued add and subtract parameters to the variable clock 34, making no change to the output clock signal of the time slave 18 (step 46). However, if the deviation is not equal to zero, then the timer adjustment element 32 tests for boundary conditions (step 48).

If the frequency ratio is greater than two (step 50) (the upper boundary condition), then the timer adjustment element 32 sets the add parameter equal to 1 and the subtract parameter equal to zero and passes them to the variable clock 34. (step 52). If the frequency ratio is not greater than 2 (e.g. frequency ratio is less than or equal to 1), then the timer adjustment element 32 tests if the frequency ratio is less than 0.5. If the frequency ratio is greater than +0.5, then the frequency ratio is between +0.5 and 2 (within the boundary conditions), and the timer adjustment element 32 sets the deviation equal to its absolute value (step 56). If the frequency ratio is less than +0.5 (the lower boundary condition), the timer adjustment element 32 sets the add parameter equal to zero and the subtract parameter equal to 2 (step 58).

Finally, the add and subtract parameter values and the calculated deviation of the frequency ratio from the ideal frequency are processed (step 60) according to the following substeps:

$$\text{Subtract\_Adjust} = \text{max integer value of subtract coefficient (65535 in the preferred embodiment)} \quad 1)$$

$$\text{Add\_Adjust} = \left[ \frac{\text{Subtract\_Adjust}}{1 + (\text{Subtract\_Adjust} * \text{deviation})} \right] \quad 2)$$

$$\text{Subtract\_Adjust} = \left[ \frac{\text{Add\_Adjust}}{1 - (\text{Add\_Adjust} * \text{deviation})} \right] \quad 3)$$

If the frequency ratio is less than one, then the values of the Add_Adjust and the Subtract_Adjust calculations are swapped and passed to the variable clock (Step 62). Otherwise, the swapping step is skipped and the Add_Adjust and the Subtract_Adjust calculations are passed directly to the variable clock 34 of the time slave device 18. (Step 64).

As previously discussed, the software overhead associated with time offsets and DL time adjustments is greatly reduced by implementing the time scaling such that software overhead is only incurred when the time rate changes. Since the time rate changes infrequently relative to the frequency with which the time stamp of the time slave device 18 is used, the overall software overhead is minimal.

In general, the rate error of the system is minimized around the nominal scale value of 1.0. The scale factor range is limited from 0.5 to 2.0; however, the scale factors for the Foundation Fieldbus devices are significantly smaller than the maximum range stated (on the order of less than 1 percent). In this range, the rate error is less than 6 parts per billion, significantly lower than the worst case maximum phase tracking error of 12.5 parts per million specified in the Fieldbus Foundation specification.

More importantly, while the rate error is much less than the worst case maximum phase tracking error of the specification, the lower rate error is achieved in hardware rather than software, and with a minimal software footprint. By minimizing the software overhead, the present invention frees up clock cycles, which would otherwise be used to scale the sense of time for the time slave device 18, for use in other processes.

Although the present invention has been described with reference to preferred embodiments, workers skilled in the art will recognize that changes may be made in form and detail without departing from the spirit and scope of the invention. For example, although the invention has been described in the context of a Foundation Fieldbus network, the invention is applicable more generally to other packet based networks as well.

The invention claimed is:

1. A method for time synchronization of field devices on a network of a distributed control system, the method comprising:
    transmitting periodically timing information from a master clock to the field devices over the network of the distributed control system; and
    adjusting a long-term output clock signal frequency and a time stamp of each field device as a function of the periodically transmitted timing information and an output clock signal local to each field device.

2. The method of claim 1 wherein the step of adjusting comprises:
    calculating a frequency ratio based upon the periodically transmitted timing information and the output clock signal;
    determining an add and a subtract parameter according to the frequency ratio; and
    varying an output of a variable clock using the add and the subtract parameters to produce the output clock signal.

3. The method of claim 1 wherein a period between transmissions of the timing information varies.

4. The method of claim 1 wherein the step of adjusting comprises:
    determining adjustment parameters;
    generating the output clock signal with a nominal rate of one output pulse for every two input pulses of the fixed rate input clock signals; and
    adding and subtracting pulses from the output clock signal based upon the adjustment parameters.

5. The method of claim 1 wherein the time stamp of each field device is synchronized to the master clock so that reading from the time stamp does not require time scaling in software.

6. A method of synchronizing a local sense of time of each of a plurality of field devices to a clock of a master field device on a segment of a control network using a time distribution data unit, the method comprising:
    detecting the time distribution data unit on the segment of the control network;
    calculating a frequency ratio comprising a sense of time of the master field device divided by the local sense of time of a field device; and
    adjusting as necessary the sense of time of the field device according to the frequency ratio.

7. The method of claim 6 further comprising:
    testing the frequency ratio against boundary conditions of the field device.

8. The method of claim 6 wherein the step of adjusting comprises:
    adding and subtracting variable pulses from a sequence of clock pulses generated by a variable clock based upon the frequency ratio.

9. The method of claim 6 wherein the sense of time of the field device is maintained by an output clock signal.

10. The method of claim 6 wherein a frequency ratio equal to one results in no adjustment to the sense of time of the field device.

11. The method of claim 6 further comprising:
    time stamping subsequently received data packets in hardware without having to scale a local sense of time in software.

12. A process control system having a common sense of time, the system comprising:
    a control network;
    a time master device in communication with the control network and having a master clock for generating a master clock signal, the time master device for periodically transmitting a time distribution data unit representative of the master clock signal; and
    a plurality of time slave devices in communication with the control network, each time slave device having a local clock, and a time adjustment element for adjusting the local clock according to a frequency ratio comprising the master clock signal divided by an output clock signal of the local clock.

13. The process control system of claim 12 wherein the time adjustment element is implemented in software.

14. The process control system of claim 12 wherein the time adjustment element is implemented as a combination of hardware and software components.

15. The process control system of claim 12 wherein the local clock includes a fixed rate clock for providing input clock pulses and a variable clock for producing the output clock signal based upon the input clock pulses and adjustment inputs from the time adjustment element.

16. The process control system of claim 15 wherein the time adjustment element calculates adjustment coefficients for use by the variable clock, and wherein the variable clock selectively adds and subtracts pulses from a sequence of pulses according to the adjustment coefficients.

17. The process control system of claim 15 wherein the output clock signal is substantially synchronized with the master clock signal.

18. A method for reducing time processing cycles in distributed field devices of a process control network, the method comprising:

calculating adjustment coefficients for each field device according to a difference in frequencies between a local clock of each field device and a master clock of a time master device on the process control network; and adjusting a long-term frequency of the local clock of each field device as needed to synchronize the local clock of each field device with the master clock of the time master device.

19. The method of claim 18 further comprising:

transmitting a time distribution data unit from the time master to the distributed field devices before the step of calculating.

20. The method of claim 18 wherein a time stamp of each field device is synchronized to the local clock of the field device such that reading a time value from the time stamp does not require scaling of the time value.

21. The method of claim 18 wherein the step of calculating adjustment coefficients comprises:

calculating a frequency ratio between the local clock of each field device and the master clock of a time master device;

determining whether the frequency ratio is within adjustment boundary conditions; and calculating the adjustment coefficients as needed for adjusting the frequency of the local clock.

* * * * *